United States Patent
Randler et al.

(10) Patent No.: US 9,592,764 B2
(45) Date of Patent: Mar. 14, 2017

(54) REDUNDANT OBJECT DETECTION FOR DRIVER ASSISTANCE SYSTEMS

(75) Inventors: Martin Randler, Immenstaad (DE); Gregory Baratoff, Wangen (DE)

(73) Assignee: Conti Temic microelectronic GmbH, Nuernberg (DE)

( * ) Notice: Subject to any disclaimer, the term of this patent is extended or adjusted under 35 U.S.C. 154(b) by 290 days.

(21) Appl. No.: 14/116,478

(22) PCT Filed: May 7, 2012

(86) PCT No.: PCT/DE2012/100127
§ 371 (c)(1),
(2), (4) Date: Nov. 8, 2013

(87) PCT Pub. No.: WO2012/152268
PCT Pub. Date: Nov. 15, 2012

(65) Prior Publication Data
US 2014/0160252 A1   Jun. 12, 2014

(30) Foreign Application Priority Data
May 11, 2011   (DE) .................. 10 2011 101 246

(51) Int. Cl.
*B60Q 9/00* (2006.01)
*G06K 9/00* (2006.01)

(52) U.S. Cl.
CPC ......... *B60Q 9/008* (2013.01); *G06K 9/00805* (2013.01)

(58) Field of Classification Search
None
See application file for complete search history.

(56) References Cited

U.S. PATENT DOCUMENTS

| | | | |
|---|---|---|---|
| 7,729,511 B2 | 6/2010 | Woehler et al. | |
| 2007/0182528 A1* | 8/2007 | Breed | B60Q 9/008 340/435 |
| 2007/0183669 A1 | 8/2007 | Owechko et al. | |
| 2007/0229238 A1* | 10/2007 | Boyles | G06K 9/00369 340/435 |
| 2007/0255480 A1 | 11/2007 | Southall et al. | |
| 2008/0030374 A1 | 2/2008 | Kumon et al. | |

(Continued)

FOREIGN PATENT DOCUMENTS

| | | |
|---|---|---|
| DE | 102 45 720 | 4/2004 |
| DE | 102012000459 | 7/2012 |
| EP | 1 179 803 | 2/2002 |

OTHER PUBLICATIONS

Nedevschi et al., "Stereo-Based Pedestrian Detection for Collision Avoidance Applications," IEEE Trans. Intelligent Transportation Systems, vol. 10, No. 3, Sep. 2009, pp. 380-391.*

(Continued)

*Primary Examiner* — Reza Aghevli
(74) *Attorney, Agent, or Firm* — W. F. Fasse

(57) ABSTRACT

A device for redundant object detection includes a stereo camera having two image sensors, a first processor for detecting objects by stereo image evaluation of image data from the two image sensors, and a second processor for classifying the detected objects by evaluation of image data from at least one of the two image sensors. A method and a program for such object detection and classification are also provided.

22 Claims, 2 Drawing Sheets

(56) References Cited

U.S. PATENT DOCUMENTS

| | | | |
|---|---|---|---|
| 2008/0036576 A1* | 2/2008 | Stein | B60R 1/00 340/425.5 |
| 2008/0088481 A1 | 4/2008 | Kumon et al. | |
| 2008/0159591 A1* | 7/2008 | Ruedin | G06K 9/6289 382/103 |
| 2009/0010490 A1* | 1/2009 | Wang | G06K 9/00771 382/103 |
| 2009/0060280 A1* | 3/2009 | Choi | G06T 7/0075 382/106 |
| 2009/0122133 A1* | 5/2009 | Hartman | H04N 13/0217 348/42 |
| 2009/0153664 A1* | 6/2009 | Higuchi | G06K 9/00805 348/148 |
| 2009/0190827 A1* | 7/2009 | Saito | G06T 7/0075 382/154 |
| 2009/0201192 A1* | 8/2009 | Tokoro | B60R 21/0134 342/70 |
| 2010/0157058 A1 | 6/2010 | Feiden | |

OTHER PUBLICATIONS

Keller et al., "A New Benchmark for Stereo-Based Pedestrian Detection," 2011 IEEE Intelligent Vehicles Symposium (IV), Jun. 5-9, 2011, pp. 691-696.*

International Search Report of the International Searching Authority for International Application PCT/DE2012/100127, mailed Nov. 16, 2012, 3 pages, European Patent Office, HV Rijswijk, Netherlands.

PCT International Preliminary Report on Patentability including English Translation of PCT Written Opinion of the International Searching Authority for International Application PCT/DE2012/100127, issued Nov. 12, 2013, 12 pages, International Bureau of WIPO, Geneva, Switzerland.

German Search Report for German Application No. 10 2011 101 246.3, dated Mar. 13, 2012, 5 pages, Muenchen, Germany, with English translation, 5 pages.

Sergiu Nedevschi et al., "Stereo-Based Pedestrian Detection for Collision-Avoidance Applications", IEEE Transactions on Intelligent Transportation Systems, vol. 10, No. 3, Sep. 1, 2009, Piscataway, NJ, USA, XP011347182, pp. 380 to 391 especially 380 to 388.

Ljubo Vlacic et al. (editors) "Intelligent Vehicle Technologies", Chapter 6: "From Door to Door—Principles and Applications of Computer Vision for Driver Assistant Systems", by Uwe Franke et al., Jan. 1, 2001, XP002683028, pp. 131 to 188 especially 148 to 175.

A. Bensrhair et al., "Stereo Vision-Based Feature Extraction for Vehicle Detection", Intelligent Vehicle Symposium 2002, IEEE, Piscataway, NJ, USA, Jun. 17, 2002, XP010635868, vol. 2, pp. 465 to 470.

Xinting Gao et al., "Implementation of Auto-Rectification and Depth Estimation of Stereo Video in a Real-Time Smart Camera System", Computer Vision and Pattern Recognition Workshops 2008, IEEE, Piscataway, NJ, USA, Jun. 23, 2008, XP031285701, pp. 1 to 7 especially pp. 1 to 2.

Fabio Dias et al., "Hardware, Design and Implementation Issues on a FPGA-Based Smart Camera", International Conference on Distributed Smart Cameras 2007, IEEE, Sep. 1, 2007, X2031151259, pp. 20 to 26.

* cited by examiner

REDUNDANT OBJECT DETECTION FOR DRIVER ASSISTANCE SYSTEMS

CROSS-REFERENCE TO RELATED APPLICATIONS

This application is the 35 USC 371 National Stage of PCT International Application PCT/DE2012/100127 as filed on 7 May 2012, and claims the 35 USC 119 priority of German Patent Application 10 2011 101 246.3 as filed on 11 May 2011. The entire disclosures of the PCT International Application and of the German Patent Application are incorporated herein by reference.

FIELD OF THE INVENTION

This invention relates to redundant object detection for driver assistance systems, in particular, to a device and method for redundant object detection using a stereo camera.

BACKGROUND INFORMATION

For safety reasons, two or more sensors are commonly used for redundant object detection, especially in driver assistance systems based on object detection that partially or fully autonomously intervene in the drive train and/or control of a vehicle, such as the accelerator or brake. Redundant object detection is to reduce the error rate of object detection and therefore to prevent false activations by a driver assistance system, especially if a braking intervention can go as far as full deceleration.

For example, a combination of a radar sensor for object detection and object measuring and a camera sensor for object detection and object classification are used in the systems that are currently known and in use. The combination of detection and classification implements a redundant object detection process by which the error rate in object detection and classification can be considerably reduced.

SUMMARY OF THE INVENTION

It is an object of this invention to provide improved redundant object detection for driver assistance systems.

This object is achieved by a device for redundant object detection with a stereo camera and by a method with the features according to embodiments of the invention as set forth herein.

It is an underlying idea of embodiments of the invention to implement redundant object detection for driver assistance systems using a stereo camera. While a stereo camera is practically considered just as a sensor, it can be used to provide redundancy of object detection by implementing another evaluation path in addition to the stereo path, i.e. the processing path for evaluating the stereo images of the camera. For example, a mono path in which objects detected in the stereo path are classified using the image data from at least one image sensor of the stereo camera to obtain redundant object detection can be implemented in addition to the stereo path. Compared to the redundancy concepts known from and used in prior art, the concept of implementing redundant object detection according to the invention by means of a stereo camera has the advantage that instead of two or more sensors, like the combination of a radar sensor and a camera sensor mentioned at the outset, just one sensor, namely, a stereo camera, has to be installed at one point in a vehicle. This makes the installation and cabling in the vehicle much easier. Another major advantage of the invention is that detection in a stereo image provides pixel-accurate localization of the object. Classification performed in a (second) mono path can be almost exactly limited to the object pixels detected or identified in the stereo path. In comparison, a combination of a radar and a camera sensor provides much less accurate referencing of an object detected using the radar sensor to the object detected in the camera image, and the error protection that can be achieved with this latter method remains below the error protection achieved with this invention.

One embodiment of the invention relates to a device for redundant object detection using a stereo camera that comprises two image sensors, first processing means for detecting objects by stereo image evaluation of image data from the two image sensors, and second processing means for classifying the objects detected by the stereo path processing means through the evaluation of image data from at least one of the two image sensors. The second processing means implement a second processing path that causes redundancy in the object detection in that it classifies the objects that were already detected in the stereo processing path. This further or additional processing path can perform the classification by analyzing or evaluating the image data from one or even both image sensors of the stereo camera.

The first processing means may be designed to generate an object list with obstacles that project from a road from disparities and/or optical flow when evaluating a stereo image and to send this object list to the second processing means for object classification. An object list generated in this way typically contains the position, dimensions, speed of the obstacles in a vehicle's own lane or in neighboring lanes.

The second processing means may be designed to perform a classification of the obstacles from the object list received based on the image data from at least one of the two image sensors and to generate a second object list with classified obstacles. For example, the second processing means may be designed to verify all detected obstacles contained in the object list received based on the image data from at least one of the two image sensors and then to classify these obstacles. The classification may in particular be used to determine an object type of an obstacle, such as a pedestrian, vehicle, closed railroad gate.

The second processing means may further be designed to use additional image data from the second of the two image sensors for classification. A second stereo path is implemented in this way in which stereo information such as disparities can in addition be used for the classification of detected objects.

The two image sensors of the stereo camera and the first and second processing means may be installed on a common printed circuit board. This enables the creation of a compact module that can be integrated in the safety system of the vehicle with relatively little wiring effort.

Another embodiment of the invention relates to a method for redundant object detection using a stereo camera that comprises two image sensors, said method comprising the following steps:
 detecting objects by stereo image evaluation of image data from two image sensors; and
 classifying the objects detected by evaluating the image data from at least one of the two image sensors.

The algorithm defined by this method may for example be performed by a processor that is provided for processing the image data from the image sensors of the stereo camera.

The step of detecting objects through stereo image evaluation may include the generation of an object list with obstacles that project from a road by means of stereo image evaluation from disparities and flow and the output of the generated object list for object classification.

The step of classifying the detected objects may include classification of the obstacles on the object list received based on image data from at least one of the two image sensors and the generation of a second object list with classified obstacles.

When classifying the obstacles on the object list received based on image data from at least one of the two image sensors, additional image data from the second of the two image sensors may be used.

And finally one embodiment of the invention relates to a program with program code for performing a method according to the invention and as described above, if the program is executed by a processor. This program may, for example, be stored in a memory of a stereo camera and executed by an image data processing processor of the stereo camera.

Other advantages and applications of this invention will be explained in the description below with reference to the embodiment(s) shown in the figure(s).

BRIEF DESCRIPTION OF THE DRAWINGS

The terms and associated reference symbols listed in the list of reference symbols below are used in the description, the claims, the abstract, and the figure(s).

Wherein.

DETAILED DESCRIPTION OF EXAMPLE EMBODIMENTS OF THE INVENTION

Figure 1:
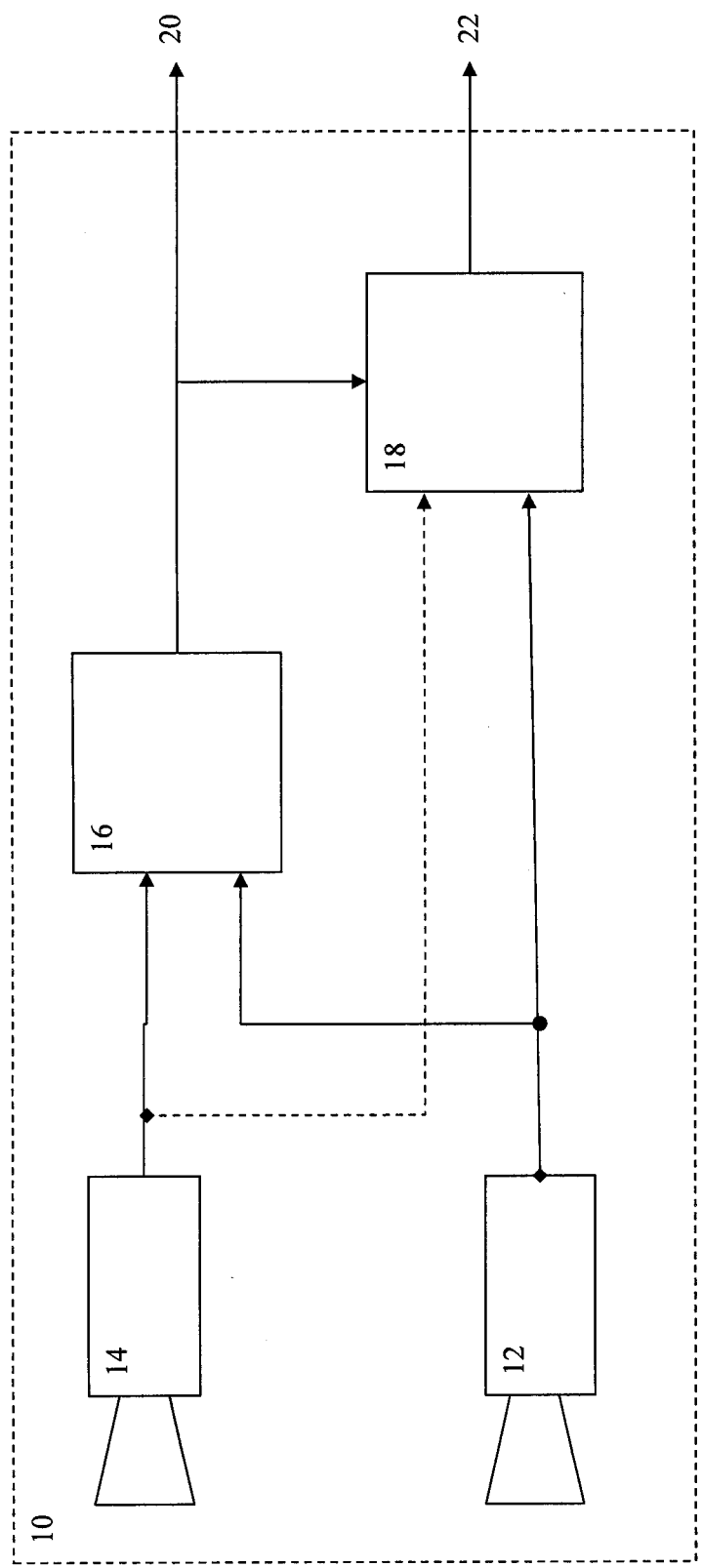
FIG. 1 shows a block diagram of an embodiment of a stereo camera module with redundant object detection according to the invention.

FIG. 1 shows a block diagram of a stereo camera module 10 for driver assistance systems. The module 10 may for example be designed in the form of a printed circuit board of an ECU (electronic control unit) that is installed in a camera body with a lens in a vehicle, for example in the area of the rearview mirror on the windshield of the vehicle. The module 10 shown differs from conventional stereo image camera modules in that, in addition to the stereo path for processing and evaluation, a mono path is provided that classifies the objects detected in the image data in the stereo path by evaluating mono images from an image sensor of the module, which provides redundant object detection. The mono path can also evaluate stereo images for classification, as will be explained below.

The term "mono path" used here should therefore not be interpreted as restricted to object classification based on evaluating mono images except when it is expressly limited to such mono image evaluation as explained in other embodiments herein.

The module 10 comprises a first and second image sensor 12 or 14, respectively, for detecting an area in front of the vehicle, in particular CCD or CMOS image sensors. The two image sensors 12 and 14 are used to capture stereo images of the area in front of the vehicle in that the two sensors 12 and 14 simultaneously capture a mono image. Each mono image captured by the sensors 12 and 14 will be sent in the form of electronic image data or image signals to a stereo path object detection processor for further processing. The processor 16 in particular evaluates the stereo images by detecting obstacles as objects that project from a road from disparities and/or flow, especially preceding vehicles, and the processor 16 determines their distance from the driver's vehicle, their speed and size by analyzing the stereo images. The processor 16 generates an object list 20 from the obstacles detected which contains these obstacles and other relevant data such as distance, speed, and size. The obstacle object list 20 is output in digital form and is also sent to a mono path object classification processor 18.

The mono path object classification processor 18 also receives image data, that is, mono images, from the first image sensor 12.

The processor 18 performs an image-based classification of the obstacles contained in the obstacle object list 20 and detected in the stereo path using the mono images received. This provides redundant object detection, since the image-based classification in the mono path includes another object detection step of the objects already detected in the stereo path.

In addition, image data from the second image sensor 14 can be sent to the mono path object classification processor 18 (shown in FIG. 1 by the dashed line from sensor 14 to the processor 18). This means that the processor 18 can also use stereo information such as disparities, which allows an even more accurate classification of the obstacles.

The two lists 20 and 22 output by the module 10 may be further processed in a driver assistance system, in particular they can be evaluated by a control algorithm for deciding on a (partially) autonomous intervention in brakes, steering, drive train control. The algorithm can base its decision either on the data from both lists 20 and 22 or just on the data from list 22.

The processors 16 and 18 shown in FIG. 1 may be implemented as separate hardware units, such as special image processing ASICs (Application Specific Integrated Circuits). Alternatively, a single powerful image processing processor may be provided in the module 10, which implements the two processors 16 and 18 as respective virtual processors configured by respective software programs in the single physical processor.

Figure 2:
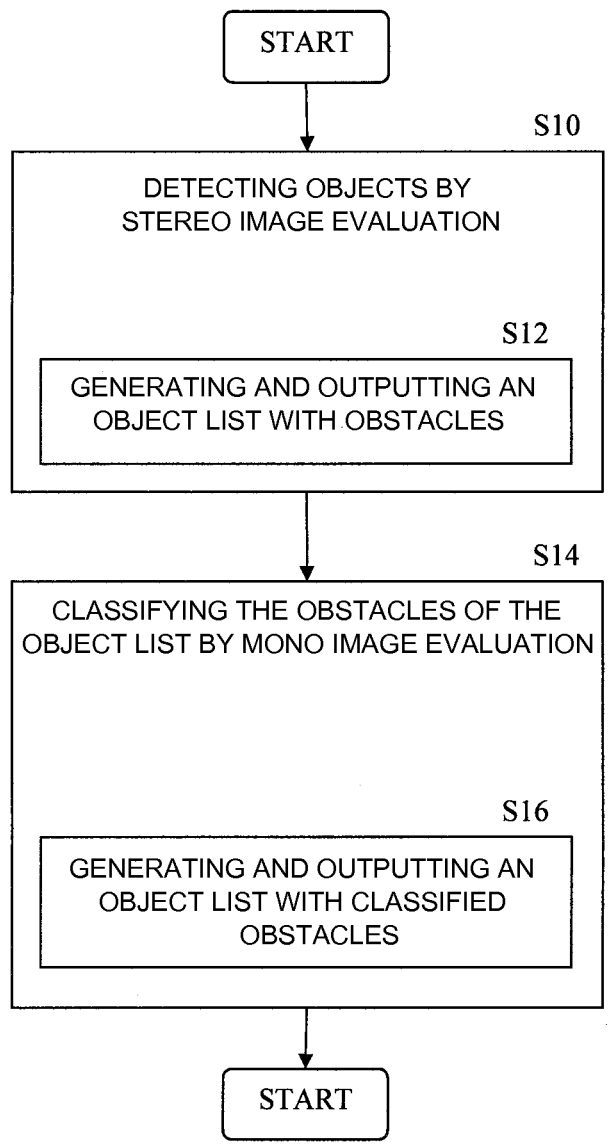
FIG. 2 shows a flow chart of an embodiment of a program for redundant object detection using a stereo camera according to the invention.

FIG. 2 shows a flow chart of such a program, which implements a method for redundant object detection using a stereo camera according to the invention. The steps S10-S16 shown there correspond to the steps performed by the processors 16 and 18. The steps of the method will be briefly described below for the sake of completeness. In step S10, objects are detected by analyzing the stereo images captured by the stereo camera. For this purpose, obstacles projecting from a road are detected as objects in step S12 from disparities and flow, such as preceding vehicles, their distance to the driver's vehicle, their speed and size. The object list 20 with obstacles which is generated in this way is output and further processed in step S14, in that the obstacles are classified by mono image evaluation of the image data from one image sensor of the stereo camera. Another list 22 with the classified obstacles is generated and output for further processing by a driver assistance system, for example, for deciding on a (partially) autonomous intervention in the vehicle dynamics.

This invention enables the redundant detection of objects for driver assistance systems using a stereo camera with which the technical implementation effort can be reduced in comparison to conventional approaches using two or more different sensors.

REFERENCE SYMBOLS

10 Stereo camera module
12 First image sensor of the stereo camera
14 Second image sensor of the stereo camera
16 Stereo path object detection processor
18 Mono path object classification processor
20 Obstacle object list
22 Classified obstacle object list

The invention claimed is:

1. A device for redundant object detection comprising:
   a stereo camera that comprises first and second image sensors configured and arranged to respectively produce, at outputs of the first and second image sensors, first and second mono image data of a scene including objects viewed by the image sensors,
   a stereo image processor that is connected to the outputs of the first and second image sensors, and that is configured to detect the objects by a stereo image evaluation of stereo image data represented by a combination of the first and second mono image data from the outputs of the first and second image sensors, and that is configured to provide object data regarding the detected objects at an output of the stereo image processor, and
   a mono image processor that has an object data input connected to the output of the stereo image processor, and that has at least one of a first image input connected to the output of the first image sensor and/or a second image input connected to the output of the second image sensor, and that is configured to classify the detected objects represented in the object data received at the object data input, by performing a redundant detection and a
   classification of the objects by a mono image evaluation of at least one of the first mono image data from the output of the first image sensor or the second mono image data from the output of the second image sensor.

2. The device according to claim 1, wherein the stereo image processor is configured to generate and provide at the output thereof, as the object data, a detected object list of the objects that have been detected as obstacles which project from a road in the scene, based on disparities and/or optical flow in the stereo image data during the stereo image evaluation.

3. The device according to claim 2, wherein the mono image processor is configured to classify the obstacles in the detected object list by the mono image evaluation of the first mono image data from the first image sensor, and to generate at an output of the mono image processor a classified object list of classified obstacles.

4. The device according to claim 1, further comprising a printed circuit board, wherein the first and second image sensors, the stereo image processor and the mono image processor are all installed in common together on the printed circuit board.

5. The device according to claim 1, wherein the stereo camera including the first and second image sensors, the stereo image processor and the mono image processor are integrated together in a unitary stereo camera module.

6. The device according to claim 5, wherein the output of the stereo image processor and an output of the mono image processor are both lead out of the unitary stereo camera module.

7. The device according to claim 5, wherein the unitary stereo camera module does not include and is not connected to receive any input from any other sensor in addition to the first and second image sensors of the stereo camera.

8. A method of redundant object detection comprising the steps:
   a) with first and second image sensors of a stereo camera respectively producing first and second mono image data of a scene including objects viewed by the image sensors;
   b) in a stereo image processor, detecting the objects, by performing a stereo image evaluation of stereo image data represented by a combination of the first and second mono image data produced by the first and second image sensors, and producing object data regarding the detected objects; and
   c) in a mono image processor, performing a redundant detection and a classification of the objects by a mono image evaluation of at least one of the first mono image data produced by the first image sensor and or the second mono image data produced by the second image sensor.

9. The method according to claim 8, wherein the step b) comprises generating, as the object data, a detected object list of the objects that have been detected as obstacles which project from a road in the scene, based on disparities and/or optical flow in the stereo image data during the stereo image evaluation.

10. The method according to claim 9, wherein the step c) comprises classifying the obstacles in the detected object list by the mono image evaluation of the first mono image data from the first image sensor, and generating at an output of the mono image processor, a classified object list of classified obstacles.

11. The method according to claim 8, further comprising outputting the object data produced by the stereo image evaluation and a result of the classifying of the detected objects by the mono image evaluation to a driver assistance system of a motor vehicle, and via the driver assistance system influencing an operation of the motor vehicle in response to and dependent on the object data and/or the result.

12. A non-transitory tangible machine-readable storage medium encoded with a computer program which, when read out of the storage medium and executed by the processors connected to the stereo camera, carries out the method according to claim 8.

13. The device according to claim 1, wherein the mono image processor has only the first image input connected to the output of the first image sensor and not the second image input connected to the output of the second image sensor, and is configured to perform the mono image evaluation only on the first mono image data and not on the second mono image data.

14. The device according to claim 1, wherein the mono image evaluation of the first mono image data by the mono image processor is limited to pixels of the first mono image data correlated to object pixels of the detected objects that are detected in the stereo image evaluation of the stereo image data by the stereo image processor.

15. The device according to claim 1, wherein the mono image evaluation by the mono image processor includes the redundant detection of the objects in the first mono image data, correlating the detected objects in the first mono image data with the detected objects represented in the object data provided by the stereo image processor to the object data input, and the classification of the detected objects.

16. The method according to claim 8, wherein the mono image evaluation is performed only on the first mono image data and not on the second mono image data.

17. The method according to claim 8, wherein the mono image evaluation of the first mono image data by the mono image processor is performed limited to pixels of the first mono image data correlated to object pixels of the detected objects that are detected in the stereo image evaluation of the stereo image data by the stereo image processor.

18. The method according to claim 8, wherein the mono image evaluation in the mono image processor includes the redundant detection of the objects in the first mono image data, correlating the detected objects in the first mono image data with the detected objects represented in the object data provided by the stereo image processor, and the classification of the detected objects.

19. A method of obstacle detection for motor vehicle comprising:
   a) with first and second image sensors of a stereo camera, respectively producing first and second mono image data of a scene including an object viewed by the image sensors;
   b) in a processor arrangement, performing a stereo image evaluation of stereo image data represented by a combination of the first and second mono image data, and based thereon detecting the object as an obstacle for the motor vehicle, and producing object data regarding the object detected as an obstacle, wherein the object data includes at least one parameter selected from a position, a distance, a dimension, and a speed of the object; and
   c) in the processor arrangement, performing a mono image evaluation of at least one of the first mono image data or the second mono image data, and based thereon redundantly detecting the object in the at least one of the first mono image data and/or the second mono image data classifying the object as to an object type thereof, and outputting corresponding classified object data including the at least one parameter and the object type of the object.

20. The device according to claim 1,
wherein the mono image processor has the first image input connected to the output of the first image sensor and the second image input connected to the output of the second image sensor, and
wherein the mono image processor is configured to perform the mono image evaluation as a purely mono image evaluation of only either the first mono image data from the output of the first image sensor or the second mono image data from the output of the second image sensor at a given time.

21. The method according to claim 8, wherein the mono image evaluation is a purely mono image evaluation of only either the first mono image data produced by the first image sensor or the second mono image data produced by the second image sensor at a given time.

22. The method according to claim 19, wherein the mono image evaluation is a purely mono image evaluation of only either the first mono image data or the second mono image data at a given time.

* * * * *

UNITED STATES PATENT AND TRADEMARK OFFICE
CERTIFICATE OF CORRECTION

PATENT NO.        : 9,592,764 B2             Page 1 of 1
APPLICATION NO.   : 14/116478
DATED             : March 14, 2017
INVENTOR(S)       : Martin Randler et al.

It is certified that error appears in the above-identified patent and that said Letters Patent is hereby corrected as shown below:

On the Title Page

Page 2, OTHER PUBLICATIONS, right column, Line 30, after "Sep. 1, 2007," replace "X2031151259" by --XP031151259--;

In the Claims

Column 5,
Line 35, after "detection and a", there should be no paragraph break;

Column 6,
Line 5, after "camera", insert --,--;
Line 19, after "sensor", replace "and or" by --and/or--;

Column 7,
Line 17, after "for", insert --a--;

Column 8,
Line 6, after "data", insert --,--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*